No. 791,508. PATENTED JUNE 6, 1905.
T. SNYDER.
WEEDER.
APPLICATION FILED FEB. 16, 1905.

2 SHEETS—SHEET 1.

Witnesses
C. K. Reichenbach.
H. M. Baldwin.

Inventor
T. Snyder,
by Chandlee & Chandlee
Attorneys

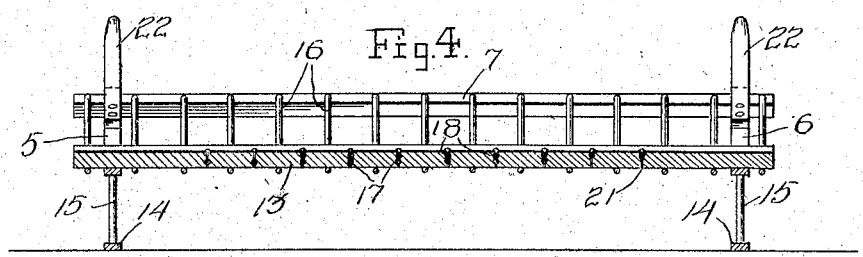
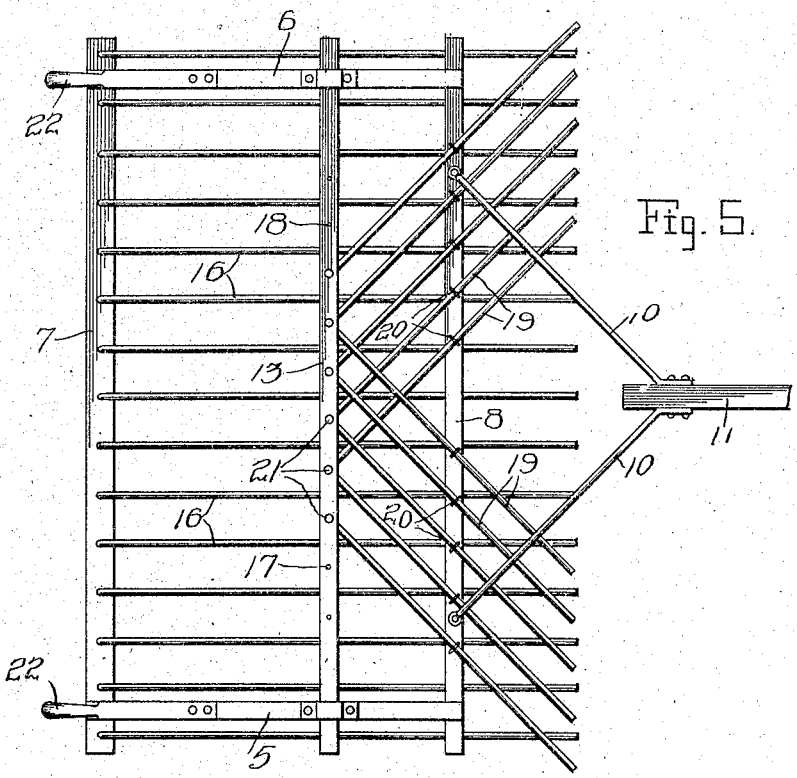

No. 791,508. Patented June 6, 1905.

UNITED STATES PATENT OFFICE.

TITUS SNYDER, OF LOUISVILLE, OHIO.

WEEDER.

SPECIFICATION forming part of Letters Patent No. 791,508, dated June 6, 1905.

Application filed February 16, 1905. Serial No. 245,893.

*To all whom it may concern:*

Be it known that I, TITUS SNYDER, a citizen of the United States, residing at Louisville, in the county of Stark, State of Ohio, have invented certain new and useful Improvements in Weeders; and I do hereby declare the following to be a full, clear, and exact description of the invention, such as will enable others skilled in the art to which it appertains to make and use the same.

This invention relates to farm implements, and more particularly to weeders, and has for its object to provide an implement of this nature in which the arrangement of the parts may be varied to suit different conditions and by means of which weeds may be removed from a field with little difficulty.

Other objects and advantages will be apparent from the following description, and it will be understood that modifications of the specific construction shown may be made and any suitable materials may be used for the various parts without departing from the spirit of the invention.

Figure 1:
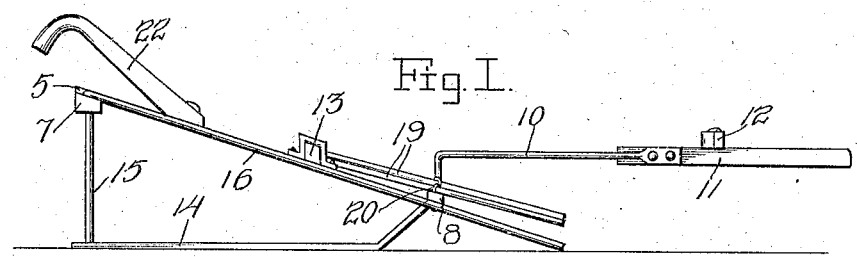
Figure 2:
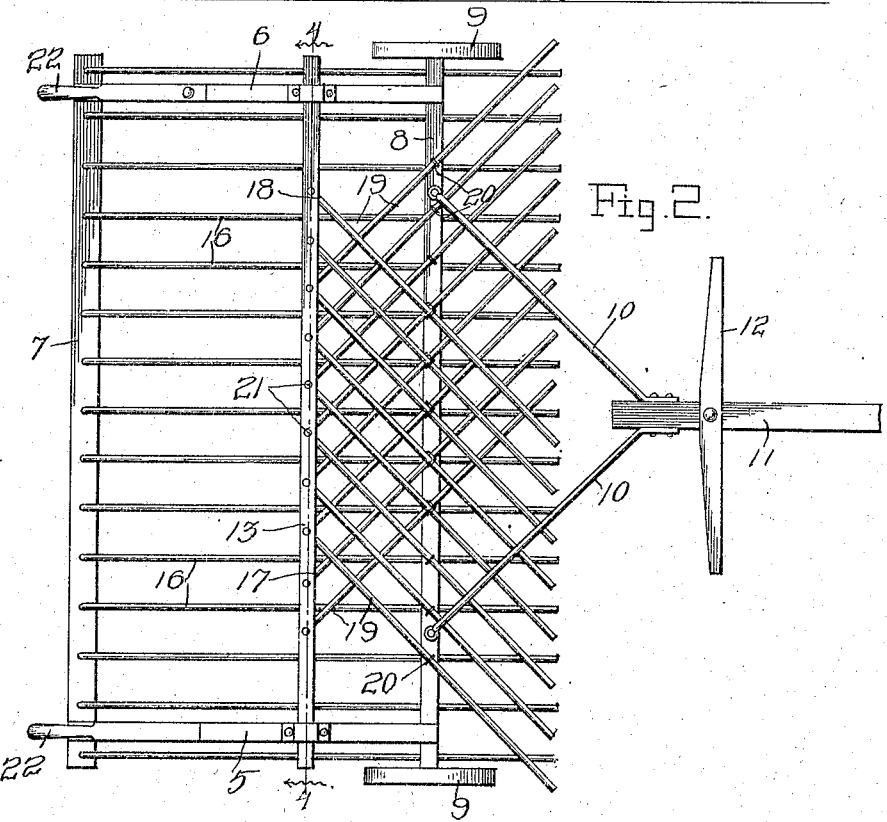
Figure 3:
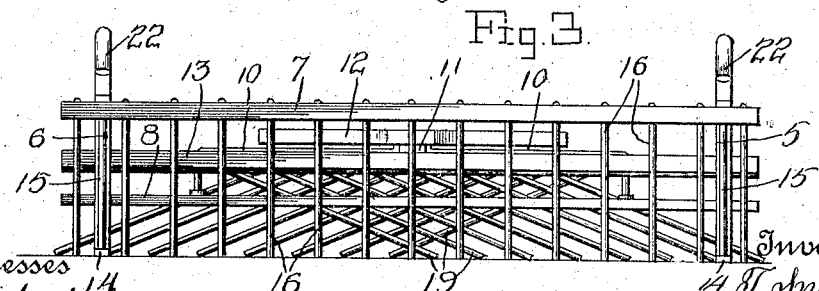

In the drawings forming a portion of this specification, and in which like numerals of reference indicate similar parts in the several views, Figure 1 is a side elevation of the present invention, the wheels being removed to show the arrangement of parts. Fig. 2 is a top plan view. Fig. 3 is a rear elevation. Fig. 4 is a section on line 4 4 of Fig. 2. Fig. 5 is a top plan of a portion of the implement, showing a number of the oblique rods removed.

Referring now to the drawings, the present invention comprises side members 5 and 6, connected at their rearward ends by a transverse member 7 and at their forward ends by a member 8, which lies parallel to the member 7, the member 8 extending beyond the side members 5 and 6 and being arranged for the reception of the movable wheels 9. The member 8 has a pair of hounds 10 secured thereto, and between these hounds there is fastened a draft-pole 11, provided with whiffletrees 12. Between the members 7 and 8 a cross member 13 is secured, adjacent to its ends, to the side members 5 and 6.

The members 5, 6, 7, and 8 form a frame, which is held with its rearward end elevated by means of a pair of rods 14, which extend rearwardly from the member 8 and which lie horizontally, these rods having a pair of upright rods 15 connected therewith at their rearward ends, the rods 15 being secured at their upper ends to the member 7. The cross member 13 is located in a plane parallel with that occupied by the members 7 and 8 and forwardly of the former, and secured to the members 7 and 8 there are a plurality of rods 16, which extend beneath the cross member 13 and which project forwardly beyond the member 8.

The cross member 13 is provided with two series of oblique openings 17 and 18, respectively, these series overlapping at the center of the member. The openings of the series 18 have their forward ends directed obliquely toward the member 5, their rearward ends being directed toward the member 6, and the openings of the series 17 follow a direction at right angles to that of the openings of the series 18. Engaged in each of these openings there is a rod 19, the rods 19 of one series crossing those of the other series at right angles, as will be readily understood, and these rods are engaged through staples 20, carried by the member 8 and extend forwardly beyond the latter, terminating in the plane occupied by the forward ends of the rods 16.

The rods 19 are removably engaged in the series of openings 17 and 18 and the staples 20 and are held against accidental disengagement from the openings by pins 21, which are removably engaged in the cross member 13 and in the rods 19.

A pair of handles 22 are provided by means of which the implement may be guided, and when in use the wheels 9 are removed and the implement is dragged over the ground by horses attached to the pole 11, the ends of the rods 16 and 19 entering the ground to remove the weeds from the field. By reason of the fact that the rods extend at different angles tall weeds are caught between the wires at their points of intersection and are torn up.

When the implement is to be used in a field of growing plants, such as young corn, the rods 19 are removed and the implement is guided to permit the plants to pass between the rods 15.

What is claimed is—

1. In an implement of the class described, the combination with spaced ground-engaging rods, of spaced rods disposed to extend at an angle to the first-mentioned rods, certain of said second-named rods crossing others of said rods, the ends of each of said rods lying in a plane with the corresponding ends of the rest of the rods, said rods being adapted for engagement of these ends in the ground.

2. In an implement of the class described, the combination with a frame, of spaced rods mounted in the frame and lying with their forward ends in position to engage the ground, draft appliances connected with the frame, and rods removably engaged in the frame, and extending at an angle to the first-named rods, said second-named rods being arranged in intersecting series and lying with their forward ends in a plane with the forward ends of the first-mentioned rods.

3. In an implement of the class described, the combination with a frame including side members, front and rear members and a central cross member, of rods secured to the front and rear members and extending forwardly beyond the front member, said forwardly-extending portions being adapted for engagement in the ground, intersecting series of spaced rods removably engaged in the cross member and detachably connected with the forward member, said rods extending at an angle to the first-mentioned rods and lying with their forward ends in a plane with those of the first-mentioned rods, handles for the implement, and detachable wheels carried by the implement.

In testimony whereof I affix my signature in presence of two witnesses.

TITUS SNYDER.

Witnesses:
E. F. WEARSTLER,
DOROTHY WEARSTLER.